3,644,387
CERTAIN SUBSTITUTED (PYRIDYLAMINO) 2-
LOWER-ALKOXY IMINO-2-LOWER-ALKOXY
ETHANES
Dietmar H. Olesch, Chicago, Ill., assignor to Velsicol
Chemical Corporation, Chicago, Ill.
No Drawing. Filed Oct. 9, 1969, Ser. No. 865,172
Int. Cl. C07d 31/42
U.S. Cl. 260—296 R                    6 Claims

ABSTRACT OF THE DISCLOSURE

This invention discloses compounds of the general formula

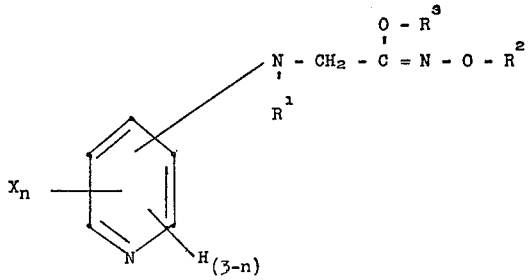

wherein X is selected from the group consisting of alkyl, alkenyl, alkoxy, alkylthio, nitro, haloalkyl and halogen; $n$ is an integer from 0 to 3; $R^1$ is selected from the group consisting of hydrogen and alkyl; $R^2$ is selected from the group consisting of alkyl and haloalkyl; and $R^3$ is alkyl. The compounds of the above description are useful as insecticides and acaricides.

---

This invention relates to new compositions of matter and more particularly relates to new chemical compounds of the general formula

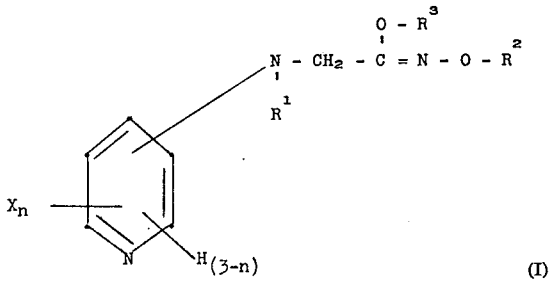

wherein X is selected from the group consisting of alkyl, alkenyl, alkoxy, alkylthio, nitro, haloalkyl and halogen; $n$ is an integer from 0 to 3; $R^1$ is selected from the group consisting of hydrogen and alkyl; $R^2$ is selected from the group consisting of alkyl and haloalkyl; and $R^3$ is alkyl.

In a preferred embodiment of the present invention X is selected from the group consisting of lower alkyl, lower alkenyl, lower alkoxy, lower alkylthio, nitro, lower chloroalkyl, trifluoromethyl, chlorine, bromine and fluorine; $n$ is an integer from 0 to 2; $R^1$ is selected from the group consisting of hydrogen and lower alkyl; $R^2$ is selected from the group consisting of lower alkyl and lower chloroalkyl; and $R^3$ is lower alkyl.

The compounds of the present invention are unexpectedly useful as insecticides and acricides.

The compounds of this invention can be readily prepared from an aminopyridine or alkylaminopyridine of the formula

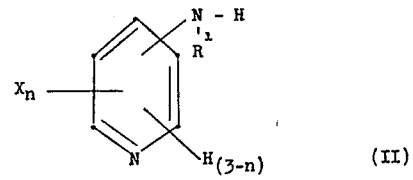

wherein X, $n$ and $R^1$ are as heretofore described, by reaction with a compound of the formula

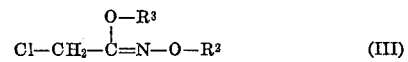

wherein $R^2$ and $R^3$ are as heretofore described. This reaction can be effected by combining the reactants in an inert organic reaction medium in the presence of an acid acceptor such as a tertiary amine or alkali metal carbonate. This reaction can be carried out at temperatures ranging from room temperature to the reflux temperature of the reaction mixture. Upon completion of the reaction the desired product can be recovered by filtration if the product forms as a precipitate or by evaporation of the solvent used if soluble therein. The product can then be used as such or can be further purified by standard techniques in the art.

The compounds of Formula III can be prepared from alpha-chloroacetamides of the formula

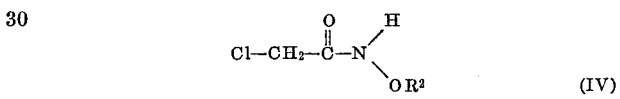

wherein $R^2$ is as heretofore defined, by reaction with a diazoalkane. This reaction can be effected by slowly adding a solution of the compound of Formula IV, with stirring, to a molar excess of a solution of the diazoalkane at a temperature below about 15° C. and preferably at a temperature of from about —10° to about 10° C. Suitable solvents for the reactants are inert organic solvents such as ether, benzene or ether-ethanol mixtures or the like. After addition is completed stirring can be continued for a short period to insure completion of the reaction. The desired product can then be recovered by evaporation of the solvents used and can then be used as such or can be further purified by conventional techniques well known in the art.

Exemplary suitable diazoalkanes for preparing the compounds of Formula IV are diazomethane, diazoethane, diazo-n-propane, diazoisopropane, diazo-t-butane, diazo-n-butane, diazo-n-pentane, diazo-n-hexane, diazo-n-octane and the like.

Exemplary amino- and alkylaminopyridines of Formula II suitable for preparing the new compounds of the present invention are 2-aminopyridine,
3-aminopyridine,
3-methylaminopyridine,
3-ethylaminopyridine,
2-amino-4-chloropyridine,
2-amino-4,5-dichloropyridine,
3-amino-6-chloropyridine,
3-amino-6-methoxypyridine,
3-amino-6-ethoxypyridine,
3-amino-6-nitropyridine,
4-aminopyridine,
2-methoxy-4-aminopyridine,
3-amino-6-methylthiopyridine,
3-amino-6-allylpyridine,
3-amino-6-pent-3-enylpyridine,
3-amino-6-trifluoromethylpyridine, 3-amino-6-chloromethylpyridine,
3-amino-4-methylpyridine,
2-amino-5-isopropylpyridine,
3-amino-4-methyl-6-chloropyridine
and the like.

The manner in which the compounds of the present invention can be prepared is more specifically illustrated in the following examples.

EXAMPLE 1

Preparation of 1-chloro-2-methoxyimino-2-methoxyethane

Ether (250 ml.) is added to a 40% aqueous solution of potassium hydroxide (85 ml.) contained in a 500 ml. Erlenmeyer flask and the resulting mixture is cooled in an ice-salt bath to −5° C. with stirring in the absence of light. N-Nitrosomethylurea (30 grams; 0.029 mol) is added over a period of about 5 minutes with cooling and is decanted into a cooled flask and a solution of N-methoxy-$\alpha$-chloroacetamide (20 grams; 0.16 mol) in ether and ethyl alcohol is slowly added with stirring and cooling over a period of about 2 hours. Stirring and cooling is continued for a period of about 4 hours after the addition is completed. The reaction mixture is then allowed to warm to room temperature and is dried over anhydrous magnesium sulfate. The mixture is filtered and the filtrate is stripped of solvents. The residue is purified by distillation under reduced pressure to yield the desired product 1-chloro-2-methoxyimino-2-methoxyethane.

EXAMPLE 2

Preparation of 1-(6-methoxy-3-pyridylamino)-2-methoxyimino-2-methoxyethane

A solution of 3-amino-6-methoxypyridine (12.4 grams; 0.1 mol) in methyl ethyl ketone (100 ml.) and pyridine (10 grams) are charged into a glass reaction vessel equipped with a mechanical stirrer, reflux condenser and addition funnel. 1-Chloro-2-methoxyimino-2-methoxyethane (14.0 grams; 0.1 mol) dissolved in methyl ethyl ketone (75 ml.) is slowly added to the flask with stirring. After the addition is completed the reaction mixture is heated with continued stirring for a period of about 2 hours. After this time the reaction mixture is filtered and the filtrate is evaporated to yield a residue. This residue is recrystallized to yield the desired product 1-(6-methoxy-3-pyridylamino)-2-methoxy-imino-2-methoxyethane.

EXAMPLE 3

Preparation of 1-chloro-2-ethoxyimino-2-methoxyethane

A newly prepared solution of diazomethane (8.4 grams; 0.2 mol) in ether (200 ml.) is placed into a 1 liter glass reaction flask equipped with a magnetic stirrer, and is cooled to a temperature of about 5° C. A solution of N-ethoxy-$\alpha$-chloroacetamide (13.7 grams; 0.1 mol) in ether (150 ml.) is then added to the reaction flask, with continuous stirring and cooling over a period of about 1 hour. After the addition is completed stirring is continued for a period of about 2 hours. After this time the reaction mixture is stripped of solvent under reduced pressure to yield 1-chloro-2-ethoxy-imino-2-methoxyethane.

EXAMPLE 4

Preparation of 1-(6-methoxy-3-pyridylamino)-2-ethoxyimino-2-methoxyethane

A solution of 3-amino-6-methoxypyridine (12.4 grams; 0.1 mol) in methyl ethyl ketone (100 ml.) and pyridine (10 grams) are charged into a glass reaction vessel equipped with a mechanical stirrer, reflux condenser and addition funnel. 1-Chloro-2-ethoxyimino-2-methoxyethane (15 grams; 0.1 mol) dissolved in methyl ethyl ketone (75 ml.) is slowly added to the flask with stirring. After the addition is completed the reaction mixture is heated with continued stirring for a period of about 3 hours. After this time the reaction mixture is filtered and the filtrate is evaporated to yield a residue. This residue is recrystallized to yield the desired product 1-(6-methoxy-3-pyridylamino)-2-ethoxyimino-2-methoxyethane.

EXAMPLE 5

Preparation of 1-(6-chloro-3-pyridylamino)-2-methoxyimino-2-methoxyethane

A solution of 3-amino-6-chloropyridine (13 grams; 0.1 mol) in methyl ethyl ketone (100 ml.) and pyridine (10 grams) are charged into a glass reaction flask equipped with a mechanical stirrer, reflux condenser and addition funnel. 1-chloro-2-methoxyimino-2-methoxyethane (14.0 grams; 0.1 mol) dissolved in methyl ethyl ketone (75 ml.) is slowly added to the flask with continuous stirring. After the addition is completed the reaction mixture is heated with continued stirring for a period of about 3 hours. After this time the reaction mixture is filtered and the filtrate is evaporated under reduced pressure to yield a residue. This residue is recrystallized to yield the desired product 1 - (6-chloro-3-pyridylamino)-2-methoxyimino-2-methoxyethane.

EXAMPLE 6

Preparation of 1-chloro-2-methoxy-imino-2-propoxyethane

A newly prepared solution of diazopropane (13.2 grams; 0.2 mol) in ether is charged into a 1 liter glass reaction flask equipped with a mechanical stirrer and is cooled to a temperature of about 5° C. A solution of N-methyl-$\alpha$-chloroacetamide (20 grams; 0.16 mol) in ether (150 ml.) is then added to the reaction flask with continuous cooling and stirring over a period of about 1 hour. After addition is completed stirring is continued for a period of about 3 hours. After this time the reaction mixture is stripped of solvent under reduced pressure to yield 1-chloro-2-methoxyimino-2-propoxyethane.

EXAMPLE 7

Preparation of 1-(5-trifluoromethyl-2-pyridylamino)-2-methoxyimino-2-propoxyethane A solution of 2-amino-5-trifluoromethylpyridine (16.2 grams; 0.1 mol) in methyl ethyl ketone (150 ml.) and pyridine (15 grams) are charged into a glass reaction flask equipped with a mechanical stirrer, reflux condenser and additional funnel. 1 - chloro - 2 - methoxyimino-2-propoxyethane (15.6) grams; 0.1 mol) dissolved in methyl ethyl ketone (100 ml.) is slowly added to the flask with stirring. After the addition is completed the reaction mixture is heated with continued stirring for a period of about 4 hours. After this time the reaction mixture is filtered to remove pyridine hydrochloride and the filtrate is stripped of solvent under reduced pressure to yield the desired product 1-(5-trifluoromethyl-2-pyridylamino)-2-pyridylamino)-2-methoxyimino-2-propoxyethane as the residue.

Additional compounds within the scope of the present invention can be prepared by the procedures detailed in the foregoing examples. In the following examples are given the essential starting materials to prepare the indicated named compounds by the procedures heretofore described.

EXAMPLE 8

N - propoxy - $\alpha$ - chloroacetamide + diazoethane + 2-methylamino - 4 - methylpridine=1 - [N - methyl-N-(4-methyl - 2 - pyridyl) - amino]-2-propoxyimino-2-ethoxyethane.

EXAMPLE 9

N - pentyloxy - $\alpha$ - chloroacetamide+diazobutane+3-amino - 5 - allylpyridine=1-(5-allyl-3-pyridylamino)-2-butoxyamino-2-pentyloxyethane.

EXAMPLE 10

N - methoxy - α - chloracetamide+diazopentane+4-amino - 6 - bromopyridine=1 - (6 - bromo - 4 - pyridylamino)-2-methoxyimino-2-pentyloxyethane.

EXAMPLE 11

N - methoxy - α - chloroacetamide+diazomethane+3-amino - 6 - nitropyridine=1-(6-nitro-3-pyridylamino)-2-methoxyimino-2-methoxyethane.

EXAMPLE 12

N - methoxy - α - chloroacetamide+diazoethane+2-propylamino - 6 - methylthiopyridine=1 - [N - propyl-N - (6 - methylthio-2-pyridyl)-amino]-2-methoxyimino-2-ethoxyethane.

EXAMPLE 13

N - ethoxy - α - chloroacetamide+diazomethane+3-amino - 6 - ethoxypyridine=1 - (6 - ethoxy-3-pyridylamino)-2-methoxyimino-2-methoxyethane.

EXAMPLE 14

N - chloromethoxy - α - chloroacetamide+diazomethane+3 - amino - 6 - trichloromethylpyridine=1-(6-trichloromethyl - 3 - pyridylamino)-2-chloromethoxyimino-2-methoxyethane.

EXAMPLE 15

N - (β - bromoethoxy)-α-chloroacetamide+diazomethane+2 - amino - 4 - propyl-6-propylthiopyridine=1-(4-propyl - 6 - propylthio - 2 - pyridylamino)-2-(β-bromoethoxyimino)-2-methoxyethane.

EXAMPLE 16

N - (δ - chlorobutoxy)-α-chloroacetamide+diazomethane+3 - pentylamino - 6 - pentyloxypyridine=1-[N-pentyl - (6 - pentyloxy) - amino]-2-(δ-chlorobutoxyimino)-2-methoxyethane.

EXAMPLE 17

N - methoxy - α - chloroacetamide+diazomethane+2-amino - 4,5 - dichloropyridine=1-(4,5-dichloro-2-pyridylamino)-2-methoxyimino-2-methoxyethane.

EXAMPLE 18

N - methoxy - α - chloroacetamide+diazomethane+3-amino - 6 - fluoropyridine=1-(6-fluoro-3-pyridylamino)-2-methoxyimino-2-methoxyethane.

EXAMPLE 19

N - methoxy - α - chloroacetamide+diazomethane+2-amino - 4 - pentyl - 6 - pentylthiopyridine=1-(4-pentyl-6 - pentylthio - 2-pyridylamino)-2-methoxyimino-2-methoxyethane.

EXAMPLE 20

N - methoxy - α - chloroacetamide+diazomethane+3-amino - 6 - iodopyridine=1-(6-iodo-3-pyridylamino)-2-methoxyimino-2-methoxyethane.

For practical use as insecticides or acaricides, the compounds of this invention are generally incorporated into insecticidal or acaricidal compositions which comprise an inert carrier and an insecticidally or acaricidally toxic amount of such a compound. Such insecticidal or acaricidal compositions, which can also be called formulations, enable the active compound to be applied conveniently to the site of the insect or acarid infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculities, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides or acaricides can be dispersed under superatmospheric pressure as aerosols. However, preferred liquid insecticidal or acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect or acarid infestation. The emulsifiers most commonly used in these concentrates are nonionic or mixtures of nonionic with anionic surface-active agents.

A typical insecticidal or acaricidal composition according to this invention is illustrated by the following example, in which the quantities are in parts by weight.

EXAMPLE 21

Preparation of a dust

| | |
|---|---|
| Product of Example 2 | 10 |
| Powdered talc | 90 |

The above ingredients are mixed in a mechanical grinder-blender and are ground until a homogeneous, free-flowing dust of the desired particle size is obtained. This dust is suitable for direct application to the site of the insect or acarid infestation.

The compounds of this invention can be applied as insecticides or acaricides in any manner recognized by the art. One method for destroying insects or acarids comprises applying to the locus of the insect or acarid infestation, as insecticidal or acaricidal composition comprising an inert carrier and, as an essential active ingredient, in a quantity which is toxic to said insects or acarids, a compound of the present invention. The concentration of the new compounds of this invention in the insecticidal or acaricidal compositions will vary greatly with the type of formulation and the purpose for which it is designed, but generally the insecticidal or acaricidal compositions will comprise from about 0.05 to about 95 percent by weight of the active compounds of this invention. In a preferred embodiment of this invention, the insecticidal or acaricidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides or acaricides in the compositions heretofore described. These other insecticides or acaricides can comprise from about 5% to about 95% of the active ingredients in the compositions. Use of the combinations of these other insecticides or acaricides with the compounds of the present invention provide insecticidal and/or acaricidal compositions which are more effective in controlling insects or acarids and often provide results unattainable with separate compositions of the individual compound. The other insecticides or acaricides with which the compounds of this invention can be used in the insecticidal or acaricidal compositions to control insects or acarids include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbophenothion, phorate, zinophos, diazinion, malathion, mevinphos, dimethoate, DBD, ronnel, oxydemetonmethyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzenes, and the like; organic carbamate compounds such as carbaryl, ortho 5353, and the like; organic sulfur compounds such as phenothiazine, phenoxathin, lauryl thiocyanate, [bis(2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene, dichloride, propylene dichloride, ethylene dibromide, ethylene oxide, methyl bromide, paradichlorobenzene, and the like.

The new compounds of this invention can be used in many ways for the control of insects or acarids. Insecticides or acaricides which are to be used as stomach poisons or protective materials can be applied to the surface on which the insects or acarids feed or travel. Insecticides or acaricides which are to be used as contact poisons or eradicants can be applied directly to the body of the insect or acarid, as a residual treatment to the surface on which the insect or acarid may walk or crawl, or as a fumigant treatment of the air which the insect or acarid breathes. In some cases, the compounds applied to the soil or plant surfaces are taken up by the plant, and the insects or acarids are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects, such as the Mexican bean beetle and the southern armyworm; the piercing-sucking insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm, worms or weevils, such as the codling moth, the alfalfa weevil, the cotton boll weevil, the pink boll worm, the plum curculio, the red banded leaf roller, the melonworm, the cabbage looper and the apple maggot, leaf miners, such as the apple leaf miner, the birch leaf miner and the beet leaf miner, and gall insects, such as the wheat joint worm and the grape phylloxera. Insects which attack below the surface of the ground are classified as substerranean insects and include such destructive pests as the woolly apple aphid, the Japanese beetle, the onion maggot and the corn rootworm.

Mites and ticks are not true insects. Many economically important species of mites and ticks can be controlled by the compounds of this present invention, such as the red spider mite, the two spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect or acarid control will depend on a variety of factors, such as the specific insect involved, intensity of the infestation, weather, type of environment, type of formulation, and the like. For example, the application of only one or two ounces of active chemical per acre may be adequate for control of a light infestation of an insect or acarid under conditions unfavorable for its feeding, while a pound or more of active compound per acre may be required for the control of a heavy infestation of insects or acarids under conditions favorable to their development.

The insecticidal activity of the compounds of the present invention can be demonstrated by experiments carried out for the control of a variety of insects.

In one experiment, designated as the housefly knockdown test, fifty three day old unsexed adult houseflies (*Musca domestica*) are anesthetized with carbon dioxide gas and placed into a fine mesh wire cage. The flies are allowed to recover completely from the effects of the carbon dioxide gas and are then sprayed with a formulation containing the indicated concentration of test compound. After 30 minutes the knockdown value of the test compound is determined. Knockdown is considered as an individual fly that is unable to move its body length, and the knockdown value is given as a percent of down flies based upon the number of down flies in comparison to a control.

In another experiment for the control of the housefly, designated as the housefly topical test, each of fifty flies is contacted with a test compound by applying 1 ml. of test formulation, containing the indicated concentrations of active compound, to the dorsum of its thorax. The flies are then placed in a wire mesh cage where they are supplied with sugar syrup. At the end of a 24 hour period the mortality of the flies is observed and rated in comparison to a control.

The insecticidal activity of the compounds of this invention can be further illustrated in experiments for the control of the pea aphid (*Acyrthosiphon pisum*) by contact. In these experiments ten day old Laxton pea plants contained in small plastic pots are each infested with ten adult pea aphids. The plants and pea aphids are then sprayed with the test compound formulated as an aqueous emulsion of an acetone solution at various concentrations. The infested plants are then placed in a holding chamber maintained at a constant temperature for a period of 48 hours. After this time the mortality of the aphids is determined and rated on a percent basis in comparison to a control.

The systemic activity of the compound of this invention can be demonstrated in experiments for the systemic control of pea aphids. In these experiments 5 day old Laxton pea plants which had previously been watered with $30\mu$ of water containing the test compound at the indicated concentration, are infested with ten, newly molted, adult pea aphids. The infested plants are then placed in a holding chamber at 65° F. for a period of 48 hours where they are supplied with water and light as required. After this time the mortality of the pea aphids is determined and rated on a percent basis in comparison to an untreated control.

The acaricidal activity of the compounds of the present invention can be demonstrated in experiments for the control of the two-spotted spider mite (*Tetranychus urticae*).

In one experiment wherein the activity of the compounds of the present invention as contact poisons is determined, the test compounds are formulated at the indicated dosages, as aqueous emulsions of acetone solutions and are sprayed onto Henderson bush lima bean plants, each infested with about 100 adult two-spotted spider mites. The treated plants are then placed into a holding room and are supplied with their daily requirement of water and light. After a period of 5 days the mortality of the mites is determined and is rated on a percentage basis in comparison to untreated controls.

In another experiment the systemic activity of the compounds of the invention can be demonstrated for the control of the two-spotted spider mite. In this experiment 5 day old Henderson bush lima bean plants are each watered with 30 ml. of a formulation containing the test compound at the indicated concentration. After a period of 48 hours the plants are infested with two-spotted spider mites and are placed into a holding room and supplied with water and light as required. After a period of 5 days the mortality of the mites is determined and rated on a percent basis in comparison to untreated controls. The results of the above experiments demonstrate the utility of the compounds of the present invention as insecticides and acaricides.

I claim:
1. A compound of the formula

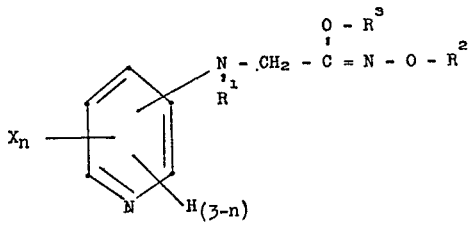

wherein X is selected from the group consisting of lower-alkyl lower-alkenyl, lower-alkoxy, lower-alkylthio, nitro, halo lower-alkyl and halogen; $n$ is an integer from 0 to 2 $R^1$ is selected from the group consisting of hydrogen and lower-alkyl; $R^2$ is selected from the group consisting of lower-alkyl, and halo lower-alkyl, and $R^3$ is alkyl.

2. The compound of claim 1, 1-(6-methoxy-3-pyridylamino)-2-methoxyimino-2-methoxyethane.
3. The compound of claim 1, 1-(6-methoxy-3-pyridylamino)-2-ethoxyimino-2-methoxyethane.
4. The compound of claim 1, 1-(6-chloro-3-pyridylamino)-2-methoxyimino-2-methoxyethane.
5. The compound of claim 1, 1-(5-trifluoromethyl-2-pyridylamino)-2-methoxyimino-2-propoxyethane.
6. The compound of claim 1, 1-(4,5-dichloro-2-pyridylamino)-2-methoxyimino-2-methoxyethane.

References Cited
UNITED STATES PATENTS
3,541,106  11/1970  Krenzer et al. _____ 260—295.5

ALAN L. ROTMAN, Primary Examiner

U.S. Cl. X.R.
260—294.8; 424—263